Paul F. Hayner
INVENTOR

July 12, 1966 P. F. HAYNER 3,260,273
MOTOR VALVE HAVING DIFFERENTIAL PRESSURE FEEDBACK
Filed April 4, 1960 4 Sheets-Sheet 2

Paul F. Hayner
*INVENTOR*

Paul F. Hayner
INVENTOR

Paul F. Hayner
INVENTOR

# United States Patent Office 3,260,273
Patented July 12, 1966

3,260,273
MOTOR VALVE HAVING DIFFERENTIAL PRESSURE FEEDBACK
Paul F. Hayner, Nashua, N.H., assignor to Sanders Associates, Inc., Nashua, N.H., a corporation of Delaware
Filed Apr. 4, 1960, Ser. No. 19,651
9 Claims. (Cl. 137—85)

This invention relates to the art of hydraulic control. More particularly, the invention relates to hydraulic servo valves.

In conventional hydraulic servo control systems, the loading effect of an output actuator device typically tends to vary. This variation in loading is reflected back in the form of changes in pressure across the device. Prior art devices have been devised to accommodate such load changes by so controlling the fluid flow through the output actuator device as to maintain the differential pressure acting across the device substantially constant. Such prior art devices, however, are relatively complex, unreliable and uneconomical to manufacture.

It is, therefore, an object of the invention to provide an improved hydraulic, servo valve having feedback.

A further object of the invention is to provide an improved hydraulic servo valve wherein the pressure across an output actuator device varies only with an input signal and is substantially independent of changes in loading.

Another object of the invention is to provide an improved, pressure-control, hydraulic, servo valve wherein the pressure across an ouput actuator device varies only with an input signal and is independent of changes in loading.

Yet another object of the invention is to provide an improved, hydraulic, servo valve having feedback wherein the feedback signal operates substantially independently of an input pilot control signal.

Still another object of the invention is to provide an improved pressure control, hydraulic, servo valve characterized by simplicity of structure, a high degree of reliability and economy of manufacture.

In accordance with the invention, there is provided a hydraulic, servo valve having feedback. The valve comprises a source of fluid under pressure and a valve means coupled to the source. The valve means has an output control outlet and a movable member adapted to control the application of the fluid under pressure through the outlet in accordance with an input signal. An output actuator means is coupled to the outlet feedback pressure means which couples the differential pressure developed across the actuator means and the movable member to vary its position in accordance with the differential pressure and provide the feedback.

As exemplified, for example, in FIG. 2, the invention includes in its contemplation a pressure control, hydraulic, servo valve. In this mode a pilot valve positions a control valve member to control the application of fluid under pressure through an output control outlet in the control valve to provide an output differential pressure across an output actuator device. The differential pressure developed across the output actuator is coupled back to a movable pilot valve member to vary its position and hence reposition the control valve member to produce a substantially constant differential pressure across the output actuator device.

For a better understanding of the present invention together with other and further objects thereof, reference is made to the following descriptions taken in connection with the accompanying drawing, and its scope will be pointed out in the appended claims.

Figure 1:
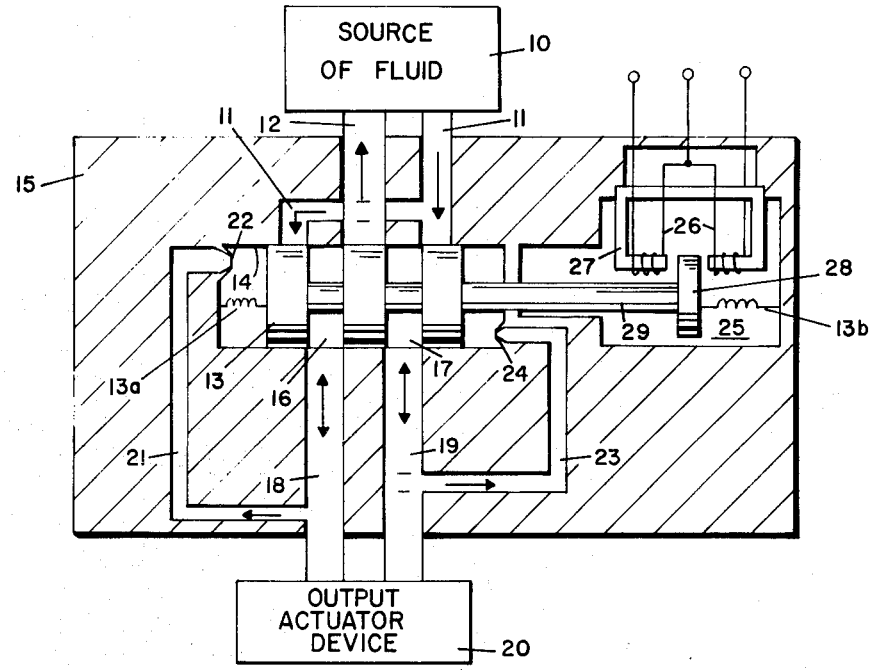
FIG. 1 is a partially schematic, sectional view of a single-stage, spool-type, hydraulic, servo valve embodying the invention.

*Description and explanation of the hydraulic valve in FIG. 1*

Referring now in more detail to the drawing and with particular reference to FIG. 1, there is here illustrated a pressure-control, hydraulic, servo valve having feedback. The embodiment of FIG. 1 generally comprises a single-stage, spool-type, hydraulic, servo valve in which a movable piston-valve is disposed within a cylinder within the valve body. The piston-valve is adapted by means of a solenoid torque motor to control the application of the fluid through an output control outlet in accordance with an input electrical signal. The output control outlet is coupled to an output actuator device. The output differential pressure developed across the output actuator device is hydraulically coupled back to either side of the piston-valve to reposition the piston-valve and so control the flow of fluid through said output control outlet as to provide substantially a constant output differential pressure across the output servo actuator device.

Thus valve means are coupled to the source 10 through an input pressure conduit 11 having a pair of branches, a shown, and return conduit 12. The valve means include a movable pilot piston-valve 13 disposed within a cylinder 14 in the valve body 15. The piston-valve is undercut to provide three piston valve lands and a pair of pressure chambers 16 and 17. The chambers 16 and 17 are coupled to a pair of output control outlets 18 and 19 respectively. The output control outlets 18 and 19 are connected as shown to output actuator device 20 such as a servo motor. The output control outlet 18 is hydraulically coupled to the left side of the piston-valve 13 through a feedback fluid passageway 21 and nozzle opening 22. The control outlet 19 is hydraulically coupled to the right side of the piston-valve 13 through a feedback, fluid passageway 23 and nozzle opening 24. The piston-valve 13 is actuated in response to solenoid torque motor generally indicated as 25. The torque motor comprises a pair of stator windings 26 disposed about a stator, permeable magnetic core 27, as shown. The stator windings 26 are connected in series, as shown, thus adapting them for push-pull connection to a source of signal current. The motor 25 includes a movable armature 28 affixed to a rod 29 extending from the right end of the piston-valve 13.

*Operation*

In typical servo valve applications, the differential pressure that appears across an output actuator device varies in response to variations in loading. When the load increases, for example, the output fluid flow tends to decrease and the differential pressure to increase. In many applications, the pressure across the output actuator device is preferably maintained constant to provide a constantly accelerated output. In order to maintain the output differential pressure across the actuator device substantially constant, this differential pressure is hydraulically coupled or fedback to the movable piston-valve to reposition it in such a manner as to negatively compensate for such pressure variations. The output differential pressure appearing across the output actuator device is thus maintained substantially constant and varies only in accordance with an input signal.

Referring now to FIG. 1, a differential input current Δi causes the armature 28 of the motor 25 to move, for example, to the right. The motion of the right hand land, as shown, of the piston valve 13 opens the input pressure conduit 11 to permit flow from the source 10 through the chamber 17 and output control outlets 19 to the output actuator device 20. Fluid returns through the output control outlet 18 to the chamber 16 and thence through the return conduit 12 to the source 10.

If the output differential pressure developed across the actuator 20 tends to increase above that level dictated by the input electrical signal, fluid under pressure is coupled through the passageway 23 and orifice 24 to the right side of the piston-valve 13. Fluid under a lesser pressure is coupled through passageway 21 and orifice 22 to the left side of the piston-valve 13. This has the effect of introducing a differential pressure across the piston-valve 13 which tends to displace it to the left and discontinue or reduce fluid flow into the chamber 17 and hence to decrease the differential pressure appearing across the actuator 20. Conversely, if the output differential pressure developed across the actuator 20 tends to decrease, the centering springs 13a and 13b tend to displace the piston-valve 13 farther to the right in opposition to the reduced pressure fedback from the output outlets 18 and 19. The dimensions of the feedback nozzles 22 and 24 are chosen to provide a linear feedback pressure.

Figure 2:
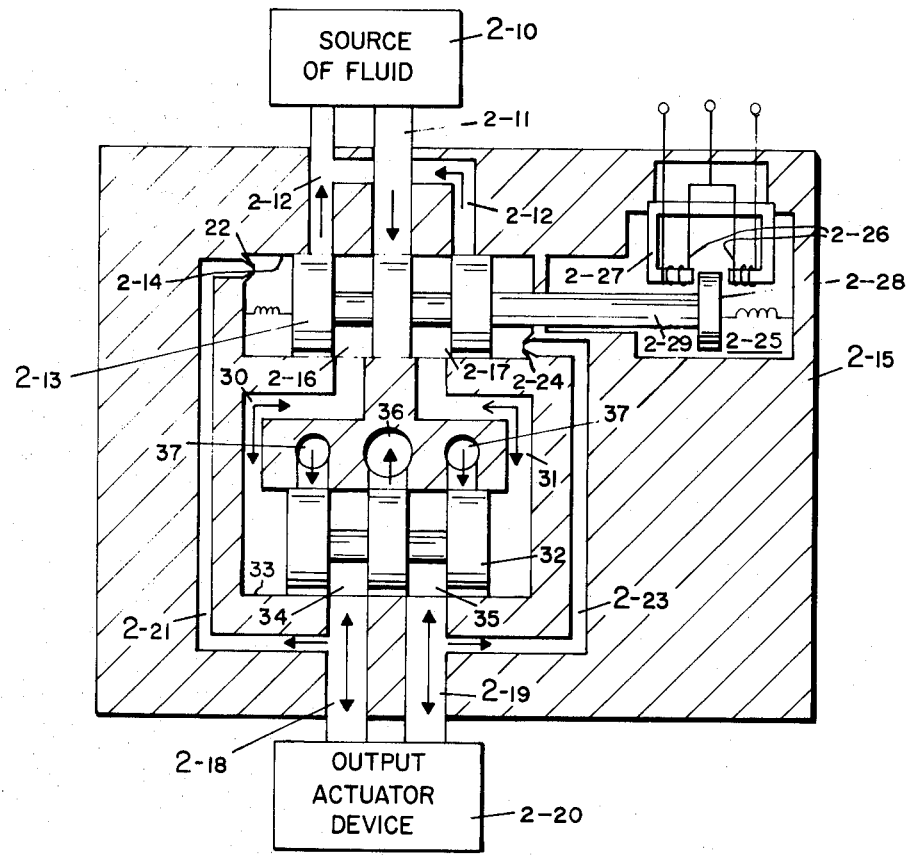
FIG. 2 is a partially schematic, sectional view of a two-stage, spool-type, hydraulic, servo valve embodying the invention.

*Description and explanation of the servo valve in FIG. 2*

Referring now in more detail to FIG. 2, there is here illustrated a two-stage, spool-type, four-way, hydraulic, servo valve having feedback.

The embodiment of the invention as illustrated in FIG. 2 differs from that in FIG. 1 in that a second, or control valve stage, has been added. The first stage will be referred to as the pilot valve and the second stage as the control valve. Otherwise, this valve is generally similar to that illustrated in FIG. 1 and described above. Accordingly, corresponding units or elements in FIG. 2 are indicated by the same reference numerals as units and elements in FIG. 1, with a prefix of 2–.

Thus the source 2–10 is coupled to a pilot-valve means having pilot pressure chambers 2–16 and 2–17 and a movable piston valve 2–13 disposed in the cylinder 2–14 of the valve body 2–15. Piston valve 2–13 is adapted by means of the solenoid torque motor 2–25 selectively to vary the pressure in the pilot chambers 2–16 and 2–17 in accordance with an input electrical signal. The pilot piston valve 2–13 controls the application of fluid under pressure from the input pressure conduit 2–11 into either of the chambers 2–16 or 2–17. Pilot chambers 2–16 and 2–17 are coupled to a pair of pilot fluid passageways 30 and 31 to the opposite ends of a control piston valve 32, as shown. Piston valve 32 is disposed in a cylinder 33 formed in the valve body 2–15 and is undercut to provide a pair of control pressure chambers 34 and 35. The piston valve 32 has three valve lands, as shown, which control the application of fluid under pressure through a pressure port 36 to either of the chambers 34 or 35. The outermost lands control the application of fluid return through a pair of fluid return ports 37. The ports 36 and 37 are preferably connected to the source 2–10, although the control valve may be connected to a separate source of fluid under pressure. The control chambers 34 and 35 are coupled, respectively to output control outlets 2–18 and 2–19 to the output actuator device 2–20. The outlets 2–18 and 2–19 are coupled back to the pilot valve through the feedback passageways 2–21 and 2–23 and the nozzle openings 2–22 and 2–24 to the opposite ends of the pilot piston valve 2–13.

In the "no signal" condition, the piston-valve 2–13 is disposed centrally to occlude the openings of the conduits 2–11 and 2–12. The pressure appearing across the central piston valve 32 is zero and the piston valve 32 is centrally disposed relative the ports 36 and 37 to occlude them. The output actuator device 2–20 is then static. In the event of a change in the output actuator device tending to develop output differential pressure between the outlets 2–18 and 2–19, the differential pressure is hydraulically fedback through the passageway 2–21 and 2–23 to reposition the pilot piston 2–13. If, for example, the motion of the output actuator 2–20 is such that the pressure in the outlet 2–19 tends to increase, the differential pressure thus produced tends to displace the pilot piston valve 2–13 to the left. This results in fluid flowing from the source 2–10 through the input pressure conduit 2–11, pilot chamber 2–17, pilot fluid passageway 31, to the right side of the piston valve 32. Fluid returns from the left side of the piston valve 22 through the passageway 30, pilot chamber 2–16 and input return conduit 2–12 to the source 2–10. The pilot pressure thus developed tends to displace the control piston valve 32 to the left to increase the pressure in the outlet 2–18 and decrease the pressure in the outlet 2–19 and components for the disturbance.

The piston valve 2–13 is displaced in accordance with an input electrical signal impressed on the solenoid torque motor 2–25. When the differential current in the motor 2–25 is such that the piston valve 2–13 is displaced to the left, for example, fluid under pressure flows from the input pressure conduit 2–11 through the chamber 2–17 to the right side of the piston valve 32. Fluid returns from the left side of the piston-valve 32 and the pilot passageway 30 to the pilot chamber 2–16 and through the fluid return conduit 2–12 to the source 2–10. The differential pilot pressure across the piston-valve 34 is such as to displace it to the left also. Fluid under pressure flows from th eport 37 into the control chamber 34 2–17 to the right side of the piston valve 32. Fluid resure flows from the port 37 into the control chamber 34 and output control outlet 2–18 to the output actuator device 2–20. Fluid returns from the actuator 2–20 through output control outlet 2–19, to the control chamber 35 and fluid return port 36.

The output differential pressure developed across the actuator 2–20 is coupled through the feedback passageway 2–21 and 2–23 and nozzle openings 2–22 and 2–24 to displace the pilot piston valve 2–13 in such a manner as to compensate for such variations in output differential pressure that take place across the output control outlets 2–18 and 2–19 other than as determined by an input electrical signal. The differential pressure thus fedback acts in opposition to the solenoid torque motor to displace the pilot piston 2–13. Thus, for example, the differential pressure across the outlets 2–18 and 2–19 is greater than that determined by an input electrical signal, the feedback pressure causes the pilot piston valve 2–13 to be displaced to the right. Fluid under pressure is then caused to flow from the input pressure conduit 2–11 from pilot pressure chamber 2–16 through the pilot passageway 30 to the left side of the piston valve 32. Fluid returns from the right side of the piston valve 32 through the pilot passageway 31, pilot pressure chamber 2–17 and fluid return conduit 2–12 to the source. Control piston valve 32 is then displaced to the right to decrease the fluid flow from the pressure port 37 through the chamber 34 and output conduit 2–18 an hence to decrease the output differential pressure across the conduits 2–18 and 2–19. Conversely, if the output differential pressure across the outlets 2–18 and 2–19 is too low, the pilot piston valve 2–13 is displaced to the left to provide a further displacement of the control piston valve 32 and increase the output differential pressure.

Figure 3:
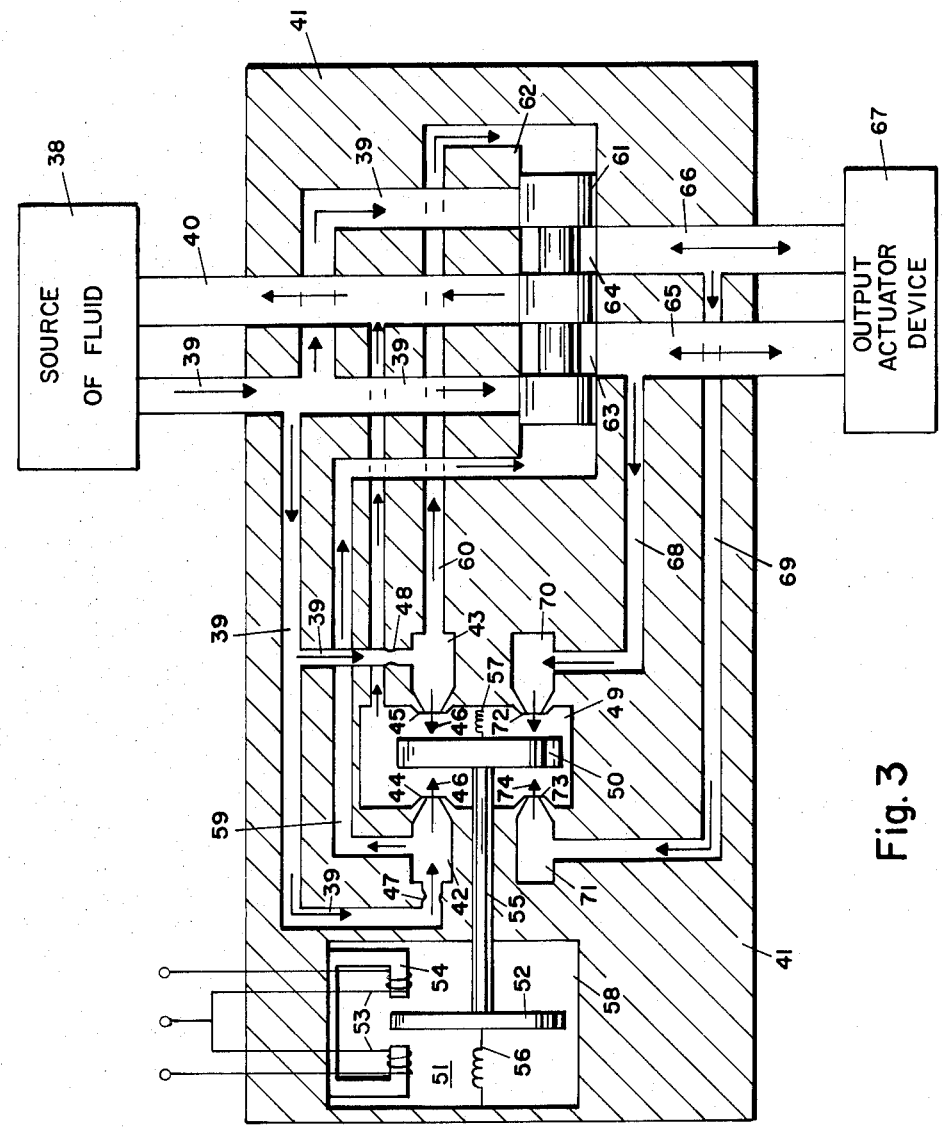
FIG. 3 is a partially schematic, sectional view of a two-stage, flapper type, hydraulic, servo valve.

*Description and explanation of the servo valve in FIG. 3*

Referring now to FIG. 3, there is here illustrated a pressure control two-stage, flapper type, hydraulic, servo valve having feedback. In this embodiment, the pilot valve includes a variable pressure chamber coupled to a source of fluid. The chamber has a nozzle opening to produce jet streams along an axis. The pilot valve means includes a movable pilot valve member which moves along the axis in opposition to the jet stream to vary the pressure in the chamber in accordance with an input signal. The variable pressure output of the chamber is coupled to the control valve to displace a control piston valve member.

Thus, a source of fluid under pressure is coupled to a pilot valve means through an input pressure conduit 39 and fluid return conduit 40. The pilot valve and control valve are disposed in a valve body 41. The pilot valve includes a pair of variable pressure chambers 42 and 43 having nozzle openings 44 and 45 which produce fluid jet streams along an axis 46. The chambers are connected to the input pressure conduit 39 through a pair of restricted orifices 47 and 48. Fluid flows from the source 38 through the restricted orifices 47 and 48 and the variable pressure chambers 42 and 43, to an input low pressure chamber 49, which is directly connected through a branch of the input return conduit 40 to the source 38. The pilot valve includes a movable member 50 adapted to move along the axis 46 in opposition to the jet streams to vary the pressure in the chambers 42 and 43 in accordance with an input signal. The member 50 is disc shaped, and preferably formed of solid metal.

A solenoid torque motor, generally indicated at 51, is disposed within the valve body 41, as shown. The torque motor includes a movable armature 52 and a pair of series connected stator windings 53 wound around the arms of a permeable magnetic core 54. The armature is affixed to the movable pilot member 50 through a rod 55 which is carried in a channel in the valve body 41. The armature 52, rod 55, and pilot member 50 assembly are assembled by a pair of biased springs 56 and 57. The solenoid 51 is disposed in a solenoid chamber 58 formed in the valve body 41. The chamber 58 is preferably hydraulically isolated from the chamber 49. The variable pressure chambers 42 and 43 are hydraulically coupled through a pair of pilot fluid passageways 59 and 60 to the opposite ends of a control piston-valve 61.

The piston valve 61 is disposed in a cylinder 62 formed in the valve body 41. The control piston-valve 61 is undercut to provide a pair of control pressure chambers 63 and 64, and three piston-valve lands. As shown here, fluid under pressure is applied from the source 38 through the input pressure conduit 39 to the end lands of the piston-valve 61. Fluid returns through fluid return conduit 40, the opening of which is controlled by the central land of the piston-valve 61. The control chambers 63 and 64 are coupled through a pair of output control outlets 65 and 66 to an output actuator device 67. The output differential pressure developed across the output control outlets 65 and 66 is coupled through a pair of feedback fluid passageways 68 and 69, feedback chambers 70 and 71 and nozzle openings 72 and 73 respectively into the chamber 49. The feedback jet streams are directed, for example, along an axis indicated at 74.

The operation of the servo valve in FIG. 3 will now be considered with respect to the equilibrium condition. At the equilibrium condition, the plot member 50 is disposed substantially equi-distantly from the pilot differental pressure chambers 42 and 43 and the feedback chambers 70 and 71. In the event that the pressure in the output control 65 tends to increase, the output differential pressure thus produced is coupled through the passageways 68 and 69 to the chambers 70 and 71 in such a manner as to displace the pilot member 50 to the left. The pressure in the chamber 42 increases and is coupled through the pilot passageway 59 to the left end of the control-piston valve 61. The pressure in the pilot chamber 43 decreases and is coupled through the passageway 60 to the right end of the piston-valve 61. The piston-valve 61, in response to the pilot differential pressure, is displaced to the right and opens the outlet 65 through the control chamber 63 to the fluid return conduit 40 and thus dissipates the tendency to increase the pressure in the outlet 65. Conversely, the piston-valve 61 would be displaced to the left as the pressure in the outlet 66 tends to increase relative to that in the outlet 65. The ouput differential pressure across the outlets 65 and 66 is thus maintained at substantially zero.

When an input electrical signal is impressed on the windings 53 of the solenoid motor 51 so that, for example, a differential current $\Delta i$ is developed tending to displace the solenoid armature 52 to the right, the resultant motion of the pilot member 50 to the right ends to occlude or restrict the effective opening of the nozzle 45 in the chamber 43 and increase the effective opening of the nozzle 44 in the chamber 42. The pressure in the chamber 43 increases while the pressure in the chamber 42 decreases to provide a pilot differential pressure which is hydraulically coupled through the pilot passageway 59 and 60 to the opposite ends of the piston-valve 61. The piston-valve 61 is displaced to the left to apply fluid under pressure through the chamber 63 to the outlet 65 and the actautor device 67. Fluid returns through the outlet 66, chamber 64 and return conduit 40 to the source 38. The pressure unbalance developed across outlets 65 and 66 is coupled through the feedback passageways 68 and 69, feedback chambers 70 and 71 and nozzle openings 72 and 73 to tend to reposition the pilot member 50 to the left in opposition to the solenoid motor 51. When the output differential pressure across the outlets 65 and 66 corresponds with a predetermined input electrical signal, the pilot member 50 is restored to its equilibrium position. As the output differential pressure across the outlets 65 and 66 tends to vary, such differential pressure variations are fed back through the passageways 68 and 69 to the pilot member 50 to compensate therefor. The output differential pressure across the outlets 65 and 66 thus remains substantially constant and varies only in accordance with the input electrical signal. The output differential pressure is, consequently, substantially independent of variations in loading.

Figure 5:
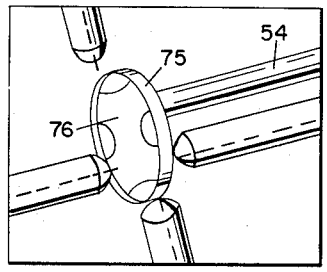
FIG. 5 is a three dimensional detailed view of the shutter mechanism of the valve illustrated in FIG. 4.
Figure 4:
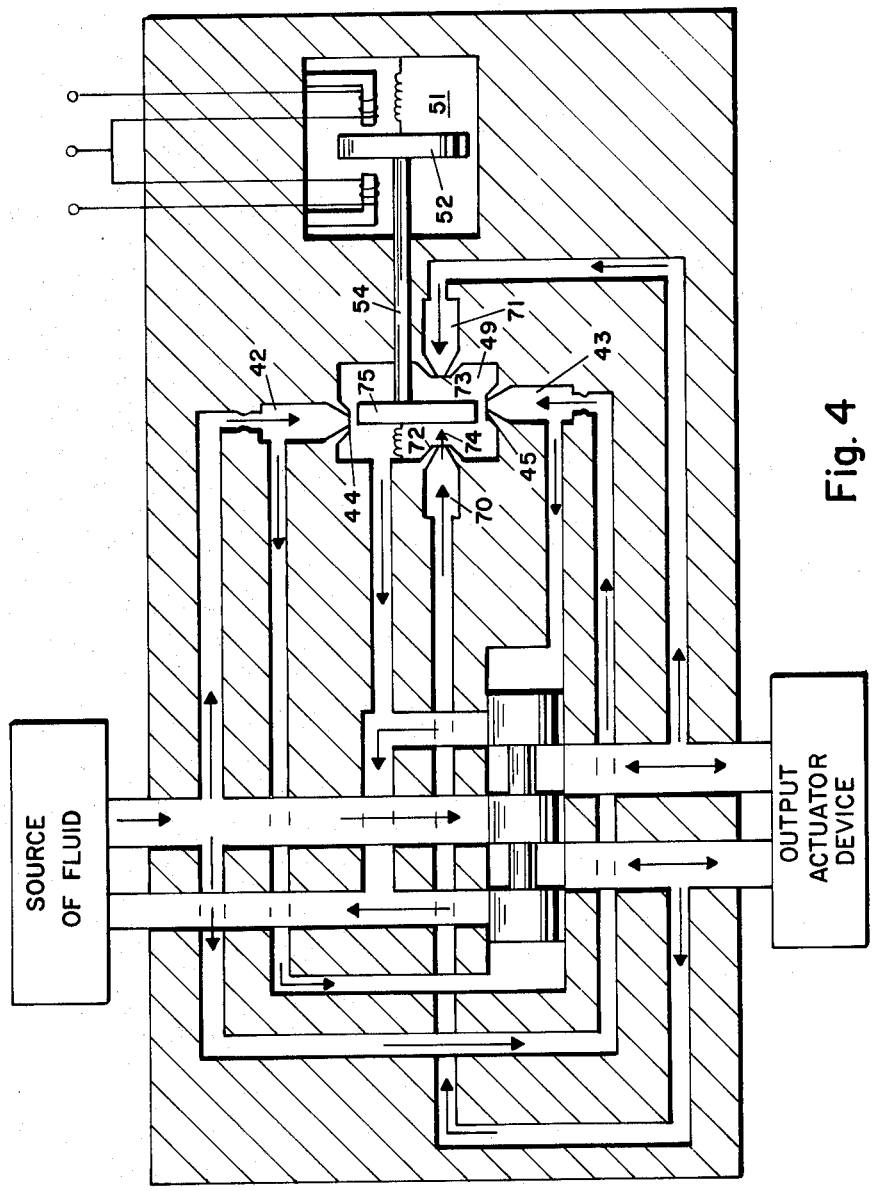
FIG. 4 is a partially schematic, sectional view of a two-stage, shutter-type, hydraulic, servo valve.

*Description and explanation of the hydraulic valve in FIGS. 4 and 5*

Referring now to FIGS. 4 and 5, the hydraulic servo valve here illustrated is a modification on the valve shown in FIG. 3 and described above. Here, a single movable pilot valve member is adapted to move transversely across a jet stream of fluid emanating from a variable pressure chamber having a nozzle opening. This transverse motion across the axis of the fluid jet stream restricts the effective opening of the nozzle and varies the pressure in the chamber in accordance with an input signal. The output differential pressure produced by the valve in its output control outlets is fed back to the movable pilot valve member along an axis orthogonal to the axes of primary pilot valve pressure control; i.e., along an axis perpendicular to the jet stream axes emanating from the pilot variable pressure chambers. Since the valve as shown in FIGS. 4 and 5 is generally similar to the valve in FIG. 3, corresponding elements are indicated by identical reference numerals.

In detail, a movable pilot member 75 is affixed to the rod extension 54 extending from the armature 52 of the solenoid torque motor generally indicated at 51.

The movable pilot member 75 is disposed adjacent a pair of variable pressure chambers 42 and 43 which are not vertically aligned. The chambers direct fluid jet streams through the nozzle openings 44 and 45 along axes which are now perpendicular to the fluid jet streams provided through the nozzle openings 72 and 73 of the feedback chambers 70 and 71 along the axis 74. The member 75 includes a web shaped supporting member 76 (FIG. 5) which is centrally affixed to the rod 54. The movable pilot member 75 is preferably formed of a thin non-magnetic permeable material in an annular and symmetrical configuration. The member 75 is thus a short thin cylinder. The pressure in the chamber 49 is quite low. The reaction forces acting in opposition to the motion of the member 75 relative to the pilot chambers 42 and 43 is substantially negligible. It is to be noted, however, that the member 75 is dynamically and positionally balanced and is very rigid although quite light. The pair of feedback loops operate along an axis perpendicular to the axis of the primary pilot pressure control and are thus mutually independent.

While there have been described what are at present considered to be the preferred embodiments of this invention, it will be obvious to those skilled in the art that various changes and modifications may be made therein without departing from the invention, and it is, therefore, aimed in the appended claims to cover all such changes and modifications as fall within the true sprit and scope of the invention.

What is claimed is:

1. A hydraulic servo valve having feedback, comprising: a valve body, a source of fluid under pressure; pilot-valve means in said valve body including at least one variable pressure chamber coupled to said source of fluid under pressure, said variable pressure chamber having a nozzle opening coupling said variable pressure chamber to a low pressure chamber, the fluid under pressure in said nozzle producing a fluid jet-stream in the low pressure chamber along an axis, a movable member with at least one planar face reciprocatably mounted in said low pressure chamber and projecting into the fluid jet stream to restrict the effective nozzle opening and vary the pressure in said variable pressure chamber in accordance with an input signal, the planar face of the movable member forming a constant angle with the axis of said fluid jet stream independent of the position of the movable member; control valve means in said valve body and coupled to said variable pressure chamber, said control valve means having first and second output conrtol outlets, said control valve means being adapted to control the application of fluid under pressure through said outlets in accordance with variations in pressure in said variable pressure chamber; an output actuator means coupled to said outlets; a differential pressure existing between said outlets and across said actuator means; feedback-pressure means coupling the differential pressure developed across said outlets and actuator means, and said movable member to vary the position of said movable member in accordance with said differential pressure and provide said feedback.

2. A hydraulic servo valve having feedback, comprising: a source of fluid under pressure; a valve body; pilot-valve means in said valve body having at least one variable pressure chamber coupled to said source of fluid under pressure and a movable member adapted to reciprocate to selectively vary the fluid pressure in said variable pressure chamber in accordance with an input signal; control valve means coupled to said variable pressure chamber and having first and second output control outlets, said control valve means having a movable control valve piston to control the application of fluid under pressure through said outlets in accordance with variations in pressure from said variable pressure chamber; an output actuator means coupled to said outlets; and feedback-pressure means coupling the differential-pressure developed across said actuator means and said movable member to vary its position in accordance with said differential pressure and provide said feedback.

3. An output-pressure control, hydraulic servo valve having feedback, comprising: a source of fluid under pressure; pilot-valve means including at least one variable pressure chamber coupled to said source of fluid pressure and to a low pressure chamber, said variable pressure chamber having a nozzle coupling said variable pressure chamber to said low pressure chamber to produce a fluid jet-stream along an axis in said low pressure chamber, a movable member with at least one planar face reciprocatably mounted in said low pressure chamber and intersecting the fluid jet-stream to vary the fluid pressure in said variable pressure chamber in accordance with an input signal, the planar face of the movable member forming a constant angle with the axis of said fluid jet-stream irrespective of the position of the movable member; control valve means coupled to said variable pressure chamber and having a pair of output control outlets, said control valve means being adapted to control the application of fluid under pressure through said outlets in accordance with variations in pressure from said variable pressure chamber; an output actuator means coupled to said outlets; and feedback-pressure means coupling the differential-pressure developed across said outlets and said movable member to vary the position of said movable member in accordance with said differential pressure and provide said feedback to produce an output fluid pressure across said actuator varying only with said input signal.

4. A hydraulic servo valve having feedback, comprising: a source of fluid under pressure; pilot-valve means having a variable pressure chamber coupled to said source of fluid and a reciprocatable movable member adapted to vary the pressure in said variable pressure chamber in accordance with an input signal; control valve means coupled to said variable pressure chamber and having a pair of output control outlets, said control valve means having a control piston-valve to control the application of fluid under pressure through said outlets in accordance with variations in pressure from said variable pressure chamber; an output actuator means coupled to said outlets; and feedback-pressure means coupling the differential-pressure developed across said outlets and said movable member to vary its position in accordance with said differential pressure and provide said feedback to produce an output fluid pressure across said actuator varying only with said input signal.

5. The hydraulic servo valve of claim 2 in which said variable pressure chamber has a nozzle opening for a jet-stream of fluid along an axis and said movable member being adapted to reciprocate transversely across and intersecting said jet-stream axis to restrict the effective nozzle opening and vary the pressure in said variable pressure chamber.

6. The hydraulic servo-valve of claim 2 in which said variable pressure chamber has a nozzle opening for a jet-stream of fluid along an axis and said movable member being adapted to reciprocate parallel to and intersecting said jet-stream axis to restrict the effective nozzle opening and vary the pressure in said variable pressure chamber.

7. An electrohydraulic valve comprising a valve body having two controlled ports, a spool in said body axially movable to control the pressure in said ports, a pilot-valve hydraulically connected to said spool operable to regulate the movement of said spool, a single electrical means connected to said pilot-valve operable in response to electrical signals applied thereto to produce a force on said pilot-valve urging it in one direction, a maximum of two pressure sensing means connected to said ports operable in response to differential pressures therein to produce a force urging said pilot-valve in a direction opposite to said one direction, movement of said pilot-valve being responsive to an unbalanced condition of said forces.

8. In a hydraulic servo system, a casing having a cavity therein adapted to receive a movable control valve member; inlet means and a pair of fluid outlets communicating with said cavity; a pair of flapper valves having a common flapper element; a common source of fluid pressure operatively interconnected with said cavity and said flapper valves whereby said control valve member is moved in accordance with movement of said common flapper member; and feedback means responsive to the pressure differential between said pair of fluid outlets adapted to be selectively interconnected to said inlet means to urge said common flapper to a central position.

9. A servo-valve comprising a valve, including a valve case, a fluid input port in said valve case, a valve member in said valve case, a fluid pressure chamber in said case, means to move said member responsive to the pressure in said chamber, means to vary the pressure in said chamber, said means including an orifice connected to said chamber, a plate movably mounted adjacent to said orifice, and means to move said plate responsive to a signal to vary the pressure at said orifice and in said chamber, a pair of load ports, separate fluid passageways connected to said load ports and means in said separate fluid passageways to generate a feedback force responsive to the difference in pressure between said load ports, and means to apply said feedback force to said plate in opposition to said signal force.

References Cited by the Examiner
UNITED STATES PATENTS

| | | |
|---|---|---|
| 1,718,673 | 6/1929 | Wettstein. |
| 2,053,797 | 9/1936 | King. |
| 2,188,834 | 1/1940 | Fischel et al. |
| 2,317,383 | 4/1943 | Hull. |
| 2,400,126 | 5/1946 | Matthews _____ 121—41 X |
| 2,939,430 | 6/1960 | Westbury _____ 121—41 |

ISADOR WEIL, Primary Examiner.

KARL J. ALBRECHT, RALPH H. BRAUNER, ALAN COHAN, Examiners.

R. NILSON, Assistant Examiner.